United States Patent [19]

Rabjohns et al.

[11] Patent Number: 4,951,069

[45] Date of Patent: Aug. 21, 1990

[54] MINIMIZATION OF COMMUNICATION FAILURE IMPACTS

[75] Inventors: Douglas T. Rabjohns, Fairport; Gregory C. Sosinski, Penfield; Jeff C. Carter, Fairport; Ernest L. Legg, Fairport; Robert M. VanDuyn, Rochester, all of N.Y.

[73] Assignee: Xerox Corporation, Stamford, Conn.

[21] Appl. No.: 428,713

[22] Filed: Oct. 30, 1989

[51] Int. Cl.[5] .................... G01D 15/06; G06F 3/12
[52] U.S. Cl. ..................................... 346/154; 364/200
[58] Field of Search ..................... 346/153.1, 154; 364/200, 900

[56] References Cited

U.S. PATENT DOCUMENTS

| | | | |
|---|---|---|---|
| 3,818,199 | 6/1974 | Grossmann et al. | 235/153 AK |
| 4,179,732 | 12/1979 | Khan et al. | 364/200 |
| 4,320,508 | 3/1982 | Takezoe | 371/22 |
| 4,589,090 | 5/1986 | Downing et al. | 364/900 |
| 4,789,985 | 12/1988 | Akahoshi et al. | 371/11 |

Primary Examiner—Donald A. Griffin
Attorney, Agent, or Firm—Ronald F. Chapuran

[57] ABSTRACT

A method of resetting an arbitrary node or input/output board in response to a control communications fault in said arbitrary node or input/output board during a real time job in an image processing apparatus having image processing means for forming an image, a controller including a plurality of nodes connected to a plurality of input/output boards and software including an application portion and a communication portion, comprising the steps of the arbitrary node or input/output board initiating a self reset independent of any other node or input/output board reset, the remaining nodes or input/output boards refraining from initiating a reset of the node or input/output board, resetting said arbitrary node or input/output board independent of said remaining nodes or input/output boards, and continuing operation of said arbitrary node or input/output board to complete the real time job run.

12 Claims, 5 Drawing Sheets

MINIMIZATION OF COMMUNICATION FAILURE IMPACTS

BACKGROUND OF THE INVENTION

The invention relates to a system for reproduction machine control, and more particularly, to the resetting of control element nodes and the minimization of communication failure impacts among the nodes for such machines.

In any complex control system, there is usually a large number of machine problems that can cause the control system to temporarily malfunction. These problems can be noise or any number of software and hardware related malfunctions or crashes. When a crash or system abnormality occurs, the system must be reset and resynchronized. In a multiprocessor control this means resynchronizing the operation of the various processors or nodes. This can include various complex resetting procedures and even require manual intervention.

In a copier/duplicator with a local communications network having a plurality of control elements or nodes, there always exists the possibility of a communication failure. If a communication failure does occur, it is important to minimize the impact of the failure on the rest of the communication network.

It would be desirable, therefore, to provide a means to localize a communications failure to one specific control board or node to minimize the impact on the communications network.

In the prior art there are examples of resetting the control of a machine. For example:

U.S. Pat. No. 4,589,090 to Downing et al., assigned to Xerox Corporation, discloses a remote processor crash recovery method wherein a fault can be detected and reset. A means is provided to isolate a fault and reset only that board so that machine operation is not interrupted. See Col. 6, lines 50-52. If a control board faults and cannot be reset, the machine will continue to run if the board is not essential to the machine. See Col. 6, lines 62-65.

U.S. Pat. No. 3,818,199 to Grossmann et al. discloses a method and apparatus for processing errors in a data processing system wherein an error can be isolated and localized to a process and then tested. See Col. 5, lines 25-32. A means is provided to let another processor take over a process assigned to a faulty processor. See Col. 5, lines 9-17.

U.S. Pat. No. 4,789,985 to Akahoshi et al. discloses a document processing apparatus having fault detection which runs a self-diagnostics test to check each resource. See Col. 5, lines 53-55. A means is provided to transfer a process from a faulty resource to an available alternative.

U.S. Pat. No. 4,320,508 to Takezoe discloses a self-diagnosing, self-correcting communications network wherein a network senses a fault and reconfigures itself appropriately. See Col. 3, lines 10-13. A means is provided to test a node for a fault by sending out a series of pulses. See Col. 3, lines 14-19. A means is also provided to catalog a fault.

A difficulty with the prior art systems is that the reliability thereof rapidly diminishes if for every communication fault detected, the reset procedure must respond as if the entire machine is affected. Another difficulty in prior art systems is the need of a designated master processor to reset the other processors and the need for separate reset lines to each of the processors. It would be desirable to be able to provide a simple and relatively inexpensive method to reset and recover from a communication fault.

It is an object, therefore, of the present invention to provide a method for each node or element of a control to reset itself independently of all other nodes or elements of the system in response to a communication failure. It is another object of the present invention to provide a method for each node or element of a control to be oblivious to a communication failure in any other node and to continue in normal operation. Other advantages of the present invention will become apparent as the following description proceeds, and the features characterizing the invention will be pointed out with particularity in the claims annexed to and forming a part of this specification.

SUMMARY OF THE INVENTION

Briefly, the present invention is the method of resetting an arbitrary node or input/output board in response to a communication fault in said arbitrary node or input/output board during a real time job run in an image processing apparatus having image processing means for forming an image, a controller including a plurality of nodes connected to a plurality of input/output boards and software including an application portion and a communication portion, comprising the steps of the arbitrary node or input/output board initiating a self reset independent of any other node or input/output board reset, the remaining nodes or input/output boards refraining from initiating a reset of the node or input/output board, resetting said arbitrary node or input/output board independent of said remaining nodes or input/output boards, and continuing operation of said arbitrary node or input/output board to complete the real time job run.

For a better understanding of the present invention, reference may be had to the accompanying drawings wherein the same reference numerals have been applied to like parts and wherein:

DETAILED DESCRIPTION OF THE DRAWINGS

DETAILED DESCRIPTION OF THE PREFERRED EMBODIMENT

Figure 1:
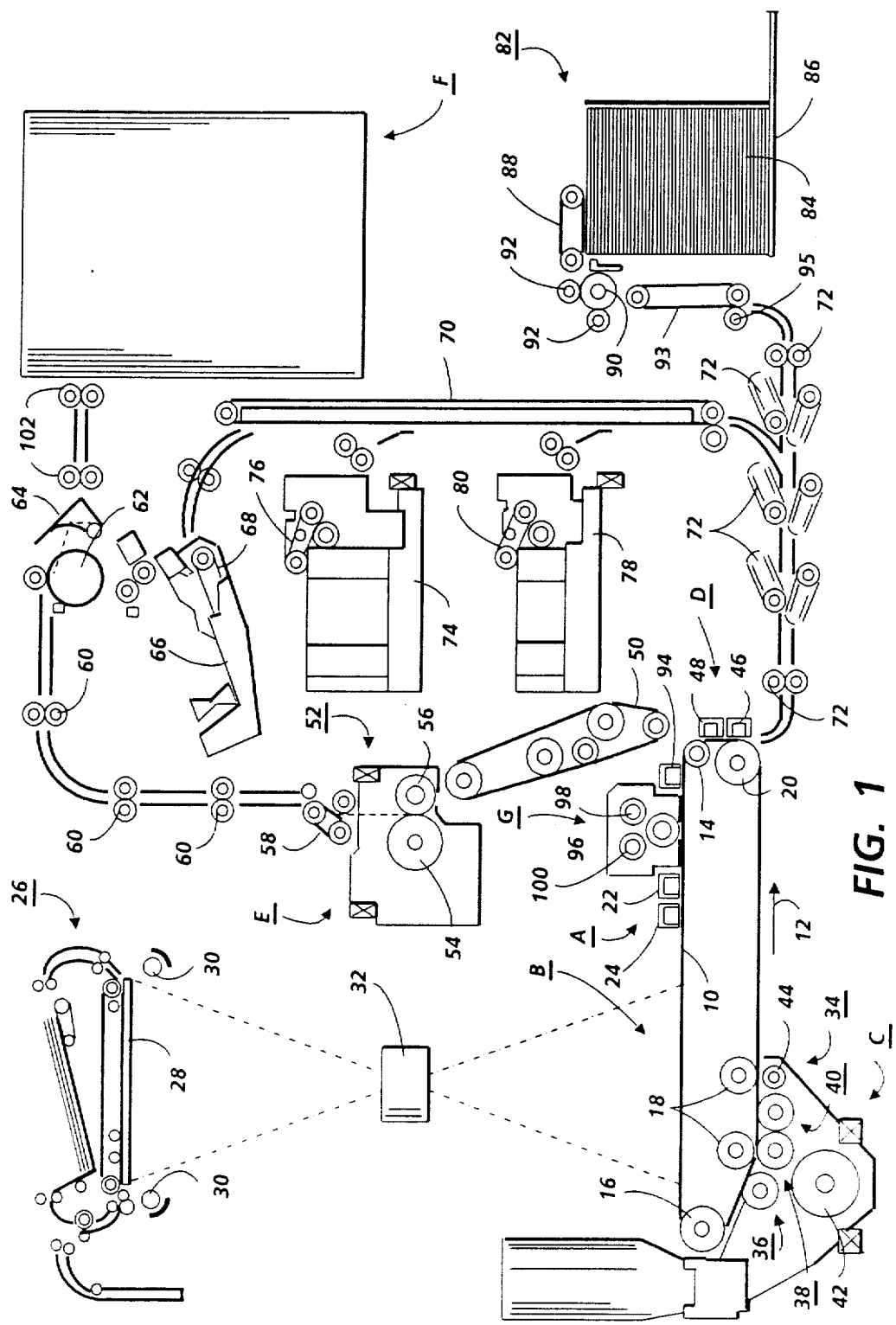
FIG. 1 is a schematic elevational view depicting various operating components and sub-systems of an exemplary reproduction machine incorporating the present invention.

For a general understanding of the features of the present invention, reference is made to the drawings. In the drawings, like reference numerals have been used throughout to identify identical elements. Referring to FIG. 1, there is shown an electro-photographic reproduction machine composed of a plurality of programmable components and sub-systems which cooperate to carry out the copying or printing job.

The machine employs a photoconductive belt 10. Belt 10 is entrained about stripping roller 14, tensioning roller 16, idler rollers 18, and drive roller 20. Drive roller 20 is rotated by a motor coupled thereto by suitable means such as a belt drive. As roller 20 rotates, it advances belt 10 in the direction of arrow 12 through the various processing stations disposed about the path of movement thereof in the direction of arrow 12 through the various processing stations disposed about the path of movement thereof.

Initially, the photoconductive surface of belt 10 passes through charging station A where two corona generating devices, indicated generally by the reference numerals 22 and 24 charge photoconductive belt 10 to a relatively high, substantially uniform potential. Next, the charged photoconductive belt is advanced through imaging station B. At imaging station B, a document handling unit 26 sequentially feeds documents from a stack of documents in a document stacking and holding tray into registered position on platen 28. A pair of Xenon flash lamps 30 mounted in the optics cavity illuminate the document on platen 28, the light rays reflected from the document being focused by lens 32 onto belt 10 to expose and record an electrostatic latent image on photoconductive belt 10 which corresponds to the informational areas contained within the document currently on platen 28. After imaging, the document is returned to the document tray via a simplex path when either a simplex copy or the first pass of a duplex copy is being made or via a duplex path when a duplex copy is being made.

The electrostatic latent image recorded on photoconductive belt 10 is developed at development station C by a magnetic brush developer unit 34 having three developer rolls 36, 38 and 40. A paddle wheel 42 picks up developer material and delivers it to the developer rolls 36, 38. Developer roll 40 is a cleanup roll while a magnetic roll 44 is provided to remove any carrier granules adhering to belt 10.

Following development, the developed image is transferred at transfer station D to a copy sheet. There, the photoconductive belt 10 is exposed to a pre-transfer light from a lamp (not shown) to reduce the attraction between photoconductive belt 10 and the toner powder image. Next, a corona generating device 46 charges the copy sheet to the proper magnitude and polarity so that the copy sheet is tacked to photoconductive belt 10 and the toner powder image attracted from the photoconductive belt to the copy sheet. After transfer, corona generator 48 charges the copy sheet to the opposite polarity to detack the copy sheet from belt 10.

Following transfer, a conveyor 50 advances the copy sheet bearing the transferred image to fusing station E where a fuser assembly, indicated generally by the reference numeral 52 permanently affixes the toner powder image to the copy sheet. Preferably, fuser assembly 52 includes a heated fuser roller 54 and a pressure roller 56 with the powder image on the copy sheet contacting fuser roller 54.

After fusing, the copy sheets are fed through a decurler 58 to remove any curl. Forwarding rollers 60 then advance the sheet via duplex turn roll 62 to gate 64 which guides the sheet to either finishing station F or to duplex tray 66, the latter providing an intermediate or buffer storage for those sheets that have been printed on one side and on which an image will be subsequently printed on the second, opposed side thereof. The sheets are stacked in duplex tray 66 face down on top of one another in the order in which they are copied.

To complete duplex copying, the simplex sheets in tray 66 are fed, in seriatim, by bottom feeder 68 back to transfer station D via conveyor 70 and rollers 72 for transfer of the second toner powder image to the opposed sides of the copy sheets. The duplex sheet is then fed through the same path as the simplex sheet to be advanced to finishing station F.

Copy sheets are supplied from a secondary tray 74 by sheet feeder 76 or from the auxiliary tray 78 by sheet feeder 80. Sheet feeders 76, 80 are friction retard feeders utilizing a feed belt and take-away rolls to advance successive copy sheets to transport 70 which advances the sheets to rolls 72 and then to transfer station D.

A high capacity feeder 82 is the primary source of copy sheets. Tray 84 of feeder 82, which is supported on an elevator 86 for up and down movement, has a vacuum feed belt 88 to feed successive uppermost sheets from the stack of sheets in tray 84 to a take away drive roll 90 and idler rolls 92. Rolls 90, 92 guide the sheet onto transport 93 which in cooperation with idler roll 95 and rolls 72 move the sheet to transfer station station D.

After transfer station D, photoconductive belt 10 passes beneath corona generating device 94 which charges any residual toner particles remaining on belt 10 to the proper polarity. Thereafter, a pre-charge erase lamp (not shown), located inside photoconductive belt 10, discharges the photoconductive belt in preparation for the next charging cycle. Residual particles are removed from belt 10 at cleaning station G by an electrically biased cleaner brush 96 and two de-toning rolls 98 and 100.

Figure 2:
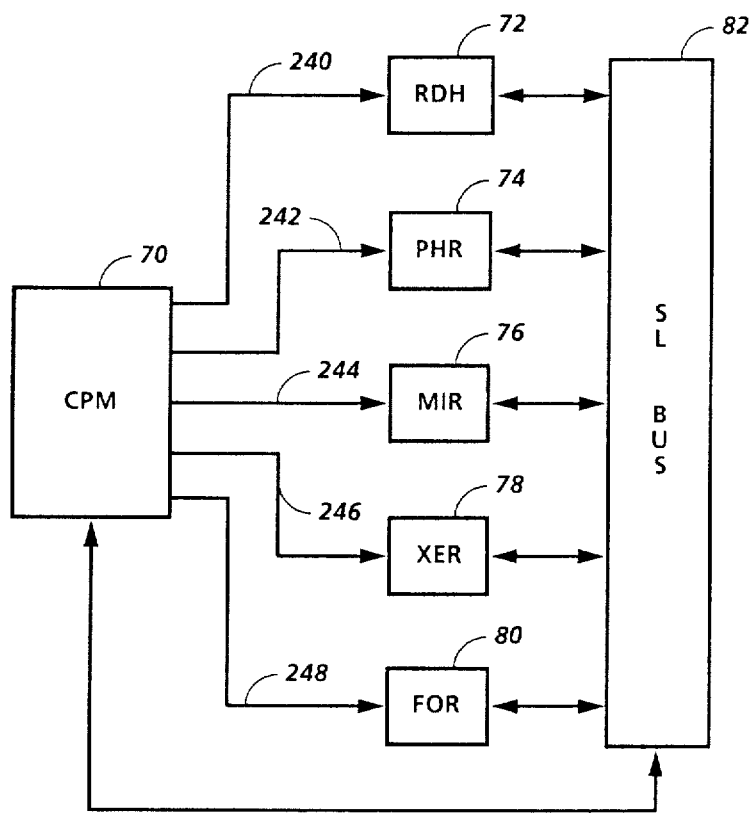
FIG. 2 is typical prior art multi-processor reset system.

With reference to FIG. 2, there is shown a typical prior art reset technique including a CPM control board 70 with separate reset lines 240, 242, 244, 246, 248 to the RDH board 72, the PHR board 74, the MIR board 76, the XER board 78 and the FOR board 82, respectively, each board having not shown individual reset circuitry for each of the reset lines. It should be noted that these separate reset lines are independent of the shared line 82 interconnecting the various control boards.

Figure 3:
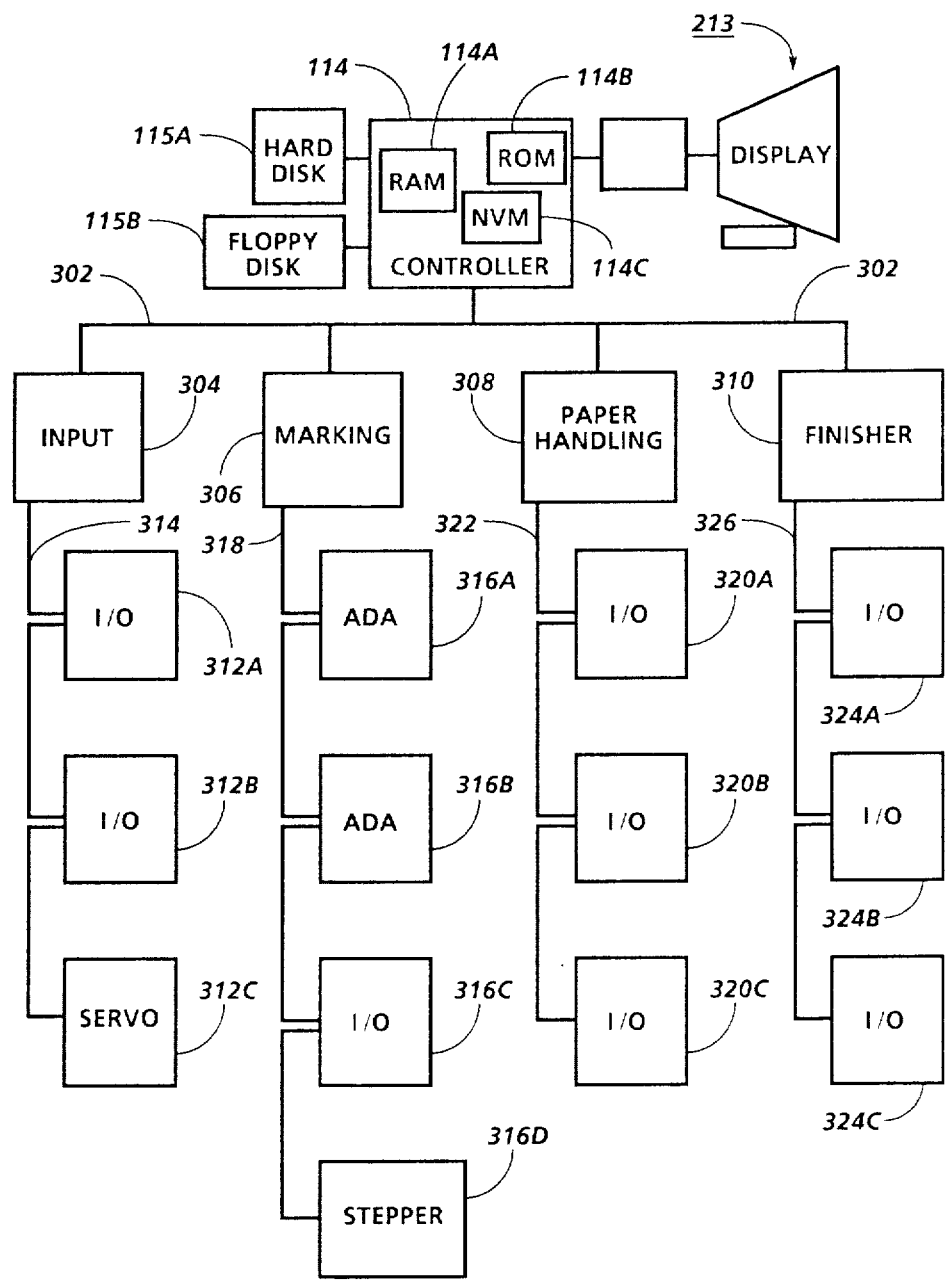
FIG. 3 is a block diagram of a reset control system embodying the present invention.

With reference to FIG. 3, there is shown the control incorporating the reset technique of the present invention. In particular, the memory includes a rigid disk drive 115A for receiving suitable rigid memory disks and a floppy disk drive 115B for receiving suitable floppy memory disks, both disk drives being electrically connected to Controller 114, the Controller 114 including RAM 114A and ROM 114B, and nonvolatile memory, NVM, 114C. In a preferred embodiment, the rigid disks are two platter, four head disks with a formatted storage capacity of approximately 20 megabytes. The floppy disks are 3.5 inch, dual sided micro disks with a formatted storage capacity of approximately 720 kilobytes. The battery backed NVM 114C is high speed CMOS RAM device with a permanent lithium battery. In normal machine operation, all of the control code and screen display information for the machine is loaded from the rigid disk at machine power up. Alternatively, all of the control code and screen display information for the machine can be loaded from a floppy disk at machine power up using the floppy disk drive built into the machine. Suitable display 213A is also connected to Controller (SAN) 114 as well as a shared line system bus 302

The shared line system bus 302 interconnects a plurality of core printed wiring boards or control boards or nodes including an input station board (ISN) 304, a marking imaging board 306, a paper handling board (PHN) 308, and a finisher/binder board (FBN) 310. Each of the core printed wiring boards is connected to local input/output (I/O) devices through a local bus. For example, the input station board 304 is connected to digital input/output boards 312A and 312B and servo board 312C via local bus 314. The marking imaging board 306 is connected to analog/digital/analog boards 316A, 316B, digital input/output board 316C, and stepper control board 316D through local bus 318. In a similar manner, the paper handling board 308 connects digital input/output boards 320A, B and C to local bus 322, and finisher/binder board 310 connects digital input/output boards 324A, B and C to local bus 326. For further details of the control, reference may be had to U.S. Ser. No. 07/164,365 filed Mar. 4, 1988 and incorporated herein. For further details of the control, reference may be had to U.S. Ser. No. 07/164,365 filed Mar. 4, 1988 and incorporated herein.

In accordance with the present invention, with reference to FIG. 3, there are disclosed five control elements for nodes 114, 304, 306, 308, and 310 interconnected by system buss 302. Each of the control boards or nodes 304, 306, 308, and 310 is interconnected to a plurality of input/output control boards by buses 314, 318, 322 and 326 as illustrated.

None of the control boards 114, 304, 306, 308, and 310 is provided with dominant status, rather each of these control boards or nodes provides its own reset initiation independent of each of the other nodes. For example, there are no separate reset lines independent of the system bus 302 connecting any of the nodes. Thus, there exists no separate reset lines or reset circuitry as illustrated in the typical prior art reset scheme shown in FIG. 2 wherein there is a designated master control element or node to initiate a reset of the other individual control elements or nodes on the network in a master/slave relationship.

Given a reproduction machine with such an internal local communication network and the possibility of various communications failures, it is necessary to minimize the impact on the remainder of the network when such a communication fault occurs. Another consideration is the reliability of the machine as seen by the user. The reliability would rapidly decrease if for every communications fault detected, the entire machine were seen to be having problems, or that it was necessary to reset the entire machine to continue operation.

In accordance with the present invention, the technique to minimize the effect of the communications failure on the entire network is to localize the failure to one specific node on the local network. A status can then be reported to the other nodes on the local network indicating that the particular node is having a problem. However, the other nodes on the network may continue operating as usual as long as it is not necessary to interact with the failed node. In the specific embodiment there are several local networks, some of the networks such as network 314 connect I/O boards such as network 314 connecting I/O boards 312A, 312B, and 312C to a control board (see FIG. 3) in particular, to control board or node 304. One network 302 (FIG. 3) interconnects the various nodes 304, 306, 308 and 310 to one another.

When an I/O board experiences a communications fault with its parent control board, the I/O board resets itself and then reestablishes communications with the control board on that local network. For example, I/O board 312A reestablishes communication to control board 304 via local network 314. None of the other I/O boards on local network 314 are effected. If a communications fault occurs between two control boards on local network 302, the control board resets itself and reestablishes communications with the other control boards on local network 302. The overall reliability of the machine is, therefore, increased since communication failures do not adversely effect the rest of the nodes on any of the local networks 302, 314, 318, 322, 326.

Figure 4:
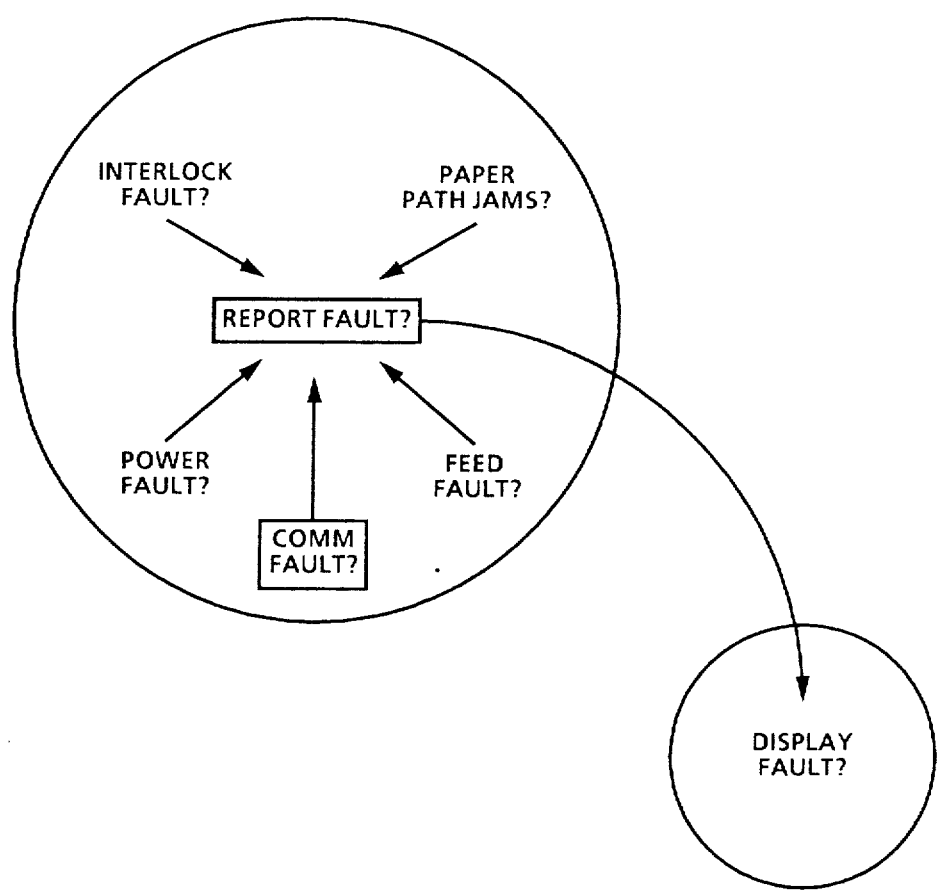
FIG. 4 is a prior art illustration of control board and node reset.

In the prior art as illustrated in FIG. 2, the prior art control, as shown in FIG. 4, did not distinguish between communications faults and any other faults. This meant all faults had to be displayed and caused on interruption of the job in progress. All control nodes were forced to reset via hardware rest lines (see FIG. 2) 240, 242, 244, 246, 2and 248. which resynchronized communications between the control nodes.

Figure 5:
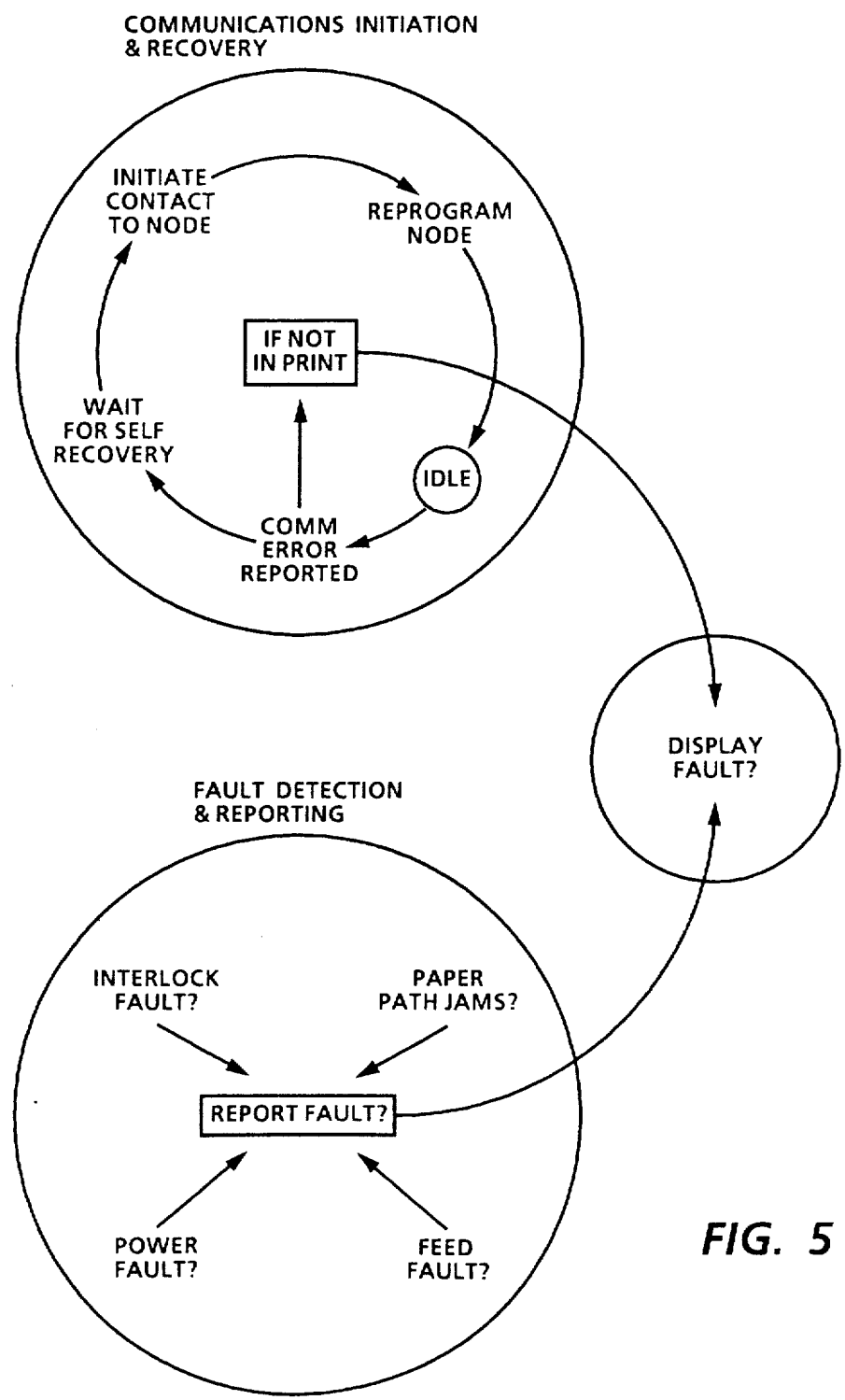
FIG. 5 is an illustration of control board and node reset in accordance with the present invention.

In the instant invention, the hardware reset lines are removed and the communications fault control is separated from all other fault control (See FIG. 5). When a communications fault is encountered, the communications fault control first checks to see if a job is in progress. If not, the fault is displayed to the user. This allows the user to communicate the fault to the service rep. If a job is in progress, the node resets itself, reestablishes communications with the other nodes on its network 302, 314, 318, 322 and 326 (see FIG. 3) and continues from the point left off prior to the communications fault. The user in this case is unaware of the communications fault.

While there has been illustrated and described what is at present considered to be a preferred embodiment of the present invention, it will be appreciated that numerous changes and modifications are likely to occur to those skilled in the art, and it is intended to cover in the appended claims all those changes and modifications which fall within the true spirit and scope of the present invention.

We claim:

1. In an image processing apparatus having image processing means for forming an image, a controller for directing the operation of the image processing means, the controller including a hardware segment including a plurality of nodes connected to a plurality of input/output boards and a software segment including an application portion and a communication portion, the method of resetting an arbitrary input/output board in response to a communication portion fault in an arbitrary input/output board during a real time job run comprising the steps of:
   said arbitrary input/output board initiating a self reset independent of any other input/output board,
   the remaining input/output boards refraining from initiating a self input/output board reset,
   resetting said arbitrary input/output board independent of said remaining input/output boards, and
   continuing operation of said arbitrary input/output board to complete the real time job run.

2. The method of claim 1 including the steps of determining that said arbitrary input/output board is nonessential to the completion of the real time job run in response to the failure of said arbitrary input/output board to reset itself and continuing to the completion of the real time job run.

3. The method of claim 2 including the step of reporting the status of the failed node to one of the plurality of nodes.

4. In an image processing apparatus having image processing means for forming an image, a controller for directing the operation of the image processing means, the controller including a hardware segment including a plurality of nodes connected to a plurality of input/output boards and a software segment including an application portion and a communication portion, the method of resetting an arbitrary node or input/output board in response to a software segment fault in said arbitrary node or input/output board during a real time job run comprising the steps of:

said arbitrary node or input/output board initiating a self reset independent of any other node or input/output board reset, the remaining nodes or input/output boards refraining from initiating a self node or input/output board reset, resetting said arbitrary node or input/output board independent of said remaining nodes or input/output boards, and continuing operation of said arbitrary node or input/output board to complete the real time job run.

5. The method of claim 4 including the steps of determining that said arbitrary node or input/output board is non-essential to the completion of the real time job run in response to the failure of said arbitrary node or input/output board to reset itself and continuing to the completion of the real time job run.

6. The method of claim 5 including the step of reporting the status of the failed reset to the other nodes.

7. The method of claim 6 wherein the software segment fault is a communication portion fault.

8. In an image processing apparatus having image processing means for forming an image, a controller for directing the operation of the image processing means, the controller including a plurality of nodes, the method of resetting an arbitrary node in response to a fault an during a real time job run comprising the steps of:

said arbitrary node initiating a self reset independent of any other node reset, the remaining nodes refraining from initiating a self node, resetting said arbitrary node independent of said remaining nodes, and continuing operation to complete the real time job run.

9. The method of claim 8 including the steps of determining that said arbitrary node is non-essential to the completion of the real time job run and continuing to the completion of the real time job run.

10. The method of claim 9 including the step of reporting the status of the failed reset to at least one of the plurality of nodes.

11. In an image processing apparatus having image processing means for forming an image, a controller for directing the operation of the image processing means, the controller including a plurality of nodes and a software segment including an application portion and a communication portion, the method of resetting an arbitrary node in response to a communication portion fault in an arbitrary node during a real time job run comprising the steps of:

said arbitrary node initiating a self reset independent of any other node, the remaining nodes refraining from initiating a self node reset, resetting said node independent of said remaining nodes, and continuing operation of said arbitrary node to complete the real time job run.

12. The method of claim 11 including the steps of determining that said arbitrary node is non-essential to the completion of the real time job run.

* * * * *